(12) United States Patent
Nii et al.

(10) Patent No.: US 9,067,559 B2
(45) Date of Patent: Jun. 30, 2015

(54) VEHICULAR SEATS

(71) Applicant: Toyota Boshoku Kabushiki Kaisha, Aichi-ken (JP)

(72) Inventors: Tomoki Nii, Aichi-ken (JP); Yoshiyuki Murata, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/222,985

(22) Filed: Mar. 24, 2014

(65) Prior Publication Data

US 2014/0291974 A1 Oct. 2, 2014

(30) Foreign Application Priority Data

Mar. 28, 2013 (JP) ................................. 2013-068987

(51) Int. Cl.
*B60R 21/207* (2006.01)
*B60R 21/16* (2006.01)

(52) U.S. Cl.
CPC ......... *B60R 21/207* (2013.01); *B60R 2021/161* (2013.01)

(58) Field of Classification Search
USPC ....................................................... 280/730.2
See application file for complete search history.

(56) References Cited

U.S. PATENT DOCUMENTS

| | | | | |
|---|---|---|---|---|
| 5,630,615 | A * | 5/1997 | Miesik | 280/730.2 |
| 5,749,597 | A * | 5/1998 | Saderholm | 280/728.2 |
| 5,860,673 | A * | 1/1999 | Hasegawa et al. | 280/730.2 |
| 5,927,749 | A * | 7/1999 | Homier et al. | 280/730.2 |
| 6,045,151 | A * | 4/2000 | Wu | 280/728.3 |
| 6,074,003 | A * | 6/2000 | Umezawa et al. | 297/216.1 |
| 6,095,602 | A * | 8/2000 | Umezawa et al. | 297/216.1 |
| 6,386,577 | B1 * | 5/2002 | Kan et al. | 280/730.2 |
| 6,457,741 | B2 * | 10/2002 | Seki et al. | 280/730.2 |
| 7,134,685 | B2 * | 11/2006 | Panagos et al. | 280/730.2 |
| 7,311,325 | B2 * | 12/2007 | Tracht et al. | 280/730.2 |
| 7,322,597 | B2 * | 1/2008 | Tracht | 280/728.3 |
| 7,331,601 | B2 * | 2/2008 | Tracht | 280/730.2 |
| 7,401,806 | B2 * | 7/2008 | Tracht | 280/730.2 |
| 7,445,234 | B2 * | 11/2008 | Hofmann | 280/730.2 |
| 7,458,603 | B2 * | 12/2008 | Buono et al. | 280/728.2 |
| 7,637,531 | B2 * | 12/2009 | Paruszkiewicz et al. | 280/730.2 |
| 7,677,594 | B2 * | 3/2010 | Hazlewood et al. | 280/728.2 |
| 7,731,226 | B2 * | 6/2010 | Zink | 280/730.2 |
| 7,823,912 | B2 * | 11/2010 | Tracht et al. | 280/730.2 |
| 7,909,359 | B2 * | 3/2011 | Inoue et al. | 280/730.2 |
| 8,328,231 | B2 * | 12/2012 | Nakamura et al. | 280/730.2 |
| 8,353,526 | B2 * | 1/2013 | Ciszek | 280/728.2 |
| 8,562,017 | B2 * | 10/2013 | Oga et al. | 280/730.2 |
| 8,662,531 | B2 * | 3/2014 | Tracht | 280/730.2 |
| 8,820,780 | B2 * | 9/2014 | Thomas | 280/730.2 |
| 8,833,852 | B2 * | 9/2014 | Festag | 297/216.13 |
| 2004/0195029 | A1 * | 10/2004 | Feldman | 180/271 |
| 2006/0113764 | A1 * | 6/2006 | Tracht | 280/730.2 |
| 2010/0133794 | A1 * | 6/2010 | Tracht et al. | 280/730.2 |
| 2010/0295282 | A1 * | 11/2010 | Kim et al. | 280/730.2 |

FOREIGN PATENT DOCUMENTS

JP 2008-37261 2/2008

* cited by examiner

*Primary Examiner* — Nicole Verley
(74) *Attorney, Agent, or Firm* — Greenblum & Bernstein, P.L.C.

(57) ABSTRACT

Embodiments of the present invention may include a vehicular seat having a seat pad, a seat cover, an airbag module, and webbing. The seat cover covers the seat pad. The airbag module is provided inside the seat pad, and has a bag body. The webbing is arranged so as to regulate a direction in which the bag body expands, and has a first portion provided integrally with the seat pad.

12 Claims, 4 Drawing Sheets

VEHICULAR SEATS

This application claims priority to Japanese patent application serial number 2013-68987, the contents of which are incorporated herein by reference.

BACKGROUND OF THE INVENTION

1. Field of the Invention

Embodiments of the present invention relate to vehicular seats. More specifically, the embodiments relate to vehicular seats equipped with an air bag module.

2. Description of the Related Art

A conventional vehicular seat equipped with an airbag module is disclosed in Japanese Laid-Open Patent Publication No. 2008-37261. The airbag module is used to protect an occupant when a vehicle undergoes collision. When placed in an operating state, the airbag module expands a bag body provided therein. Generally speaking, the airbag module is provided in an end portion of the vehicular seat close to a vehicle's door.

The bag body of the airbag module bursts forth while tearing a part of the seat pad and the seat cover. So that the bag body may expand to an exterior of the seat, there is provided a burst line at a specific position on the seat. It is from this position from which the bag body bursts forth.

Inside the seat, there is provided a cloth member configured to guide the bag body. The cloth member is arranged so as to connect the airbag module and the burst line. The cloth member is generally formed of a material that is hard to expand, and is called webbing. As shown in FIG. 4, webbing 6 is generally arranged, for example, between a seat cover 7 and a seat pad 3. An end portion of the webbing 6 is fixed to a seat frame 5 via a fixing member 91 or a webbing bracket 92. This enables the webbing 6 to exert its function.

As described above, however, it is necessary to provide a component for mounting the webbing to the seat frame. It is necessary to mount the webbing to the seat frame. This results in a rather large number of components and a lot of manufacturing man-hours. When the seat is completed, the seat frame, for example, is situated at a position where it is not touched by anyone, so that it usually exhibits a burr. If the burr is not removed, there is the possibility that the webbing may be cut upon contact with the burr. Thus, it is necessary to remove the burr at the portion where the webbing is mounted. As a result, there is involved a further increase in the number of man-hours in manufacturing the seat.

Therefore, there is a need in the art for a seat involving less components and fewer manufacturing man-hours.

SUMMARY OF THE INVENTION

According to an aspect of the invention, certain embodiments of the present invention include a vehicular seat having a seat pad, a seat cover, an airbag module, and webbing. The seat cover covers the seat pad. The airbag module is provided inside the seat pad, and has a bag body. The webbing is arranged so as to control the direction in which the bag body expands, and has a first portion provided integrally with the seat pad.

Thus, there is no need to perform a special operation for fixing the first portion of the webbing at a certain position. Further, there is no need to provide a member for fixing the first portion of the webbing at a certain position. As a result, the number of components of the seat is reduced, and it is possible to maintain a relatively low weight of the seat. Since one end of the webbing is provided integrally with the seat pad, there is no need to mount the end to the seat frame. Thus, there is no need for the webbing to extend to the seat frame, and in this way it is possible to make the webbing relatively short.

In another aspect of the invention, the webbing may have an embedded portion in the seat pad. The embedded portion may or may not include the first portion. Thus, the webbing is firmly fixed to the seat pad. The webbing is generally difficult to deform so as to be in conformity with a rounded configuration. Thus, when the webbing is arranged so as to extend along the seat cover, there is a fear that the webbing may affect the design of the seat. In contrast, the embedded portion of the webbing is embedded in the seat pad. As a result, the embedded portion of the webbing is separated from the seat cover, making it possible to suppress the influence of the webbing on the design property of the seat.

In another aspect of the invention, the seat cover may include a main surface portion, a side front surface portion, and a side surface portion. The main surface portion is situated so as to contact the back of an occupant. The side front surface portion extends obliquely forwards from the main surface portion. The side surface portion extends from the side front surface portion to form a side surface of the seat. A first webbing may provided closer to the side front surface portion than the airbag module, and it may have a first portion provided integrally with the seat pad. A second webbing may be provided closer to the side surface portion than the airbag module.

Thus, when the occupant sits in the seat, the weight of the occupant is transmitted to the first webbing via the seat pad. Thus, it is possible for the first webbing to utilize the weight of the occupant as a guide for the bag body. As a result, the possibility that the bag body bursts out from the burst line is further increased. The first webbing is closer to the occupant sitting in the seat than the second webbing. The first webbing has the first portion provided integrally with the seat pad. Thus, it is possible to suitably suppress the influence of the first webbing on the design property of the seat. Thus, it is possible to suitably suppress deterioration in the value of the seat.

DETAILED DESCRIPTION OF THE INVENTION

Each of the additional features and teachings disclosed above and below may be utilized separately or in conjunction with other features and teachings to provide improved vehicular seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
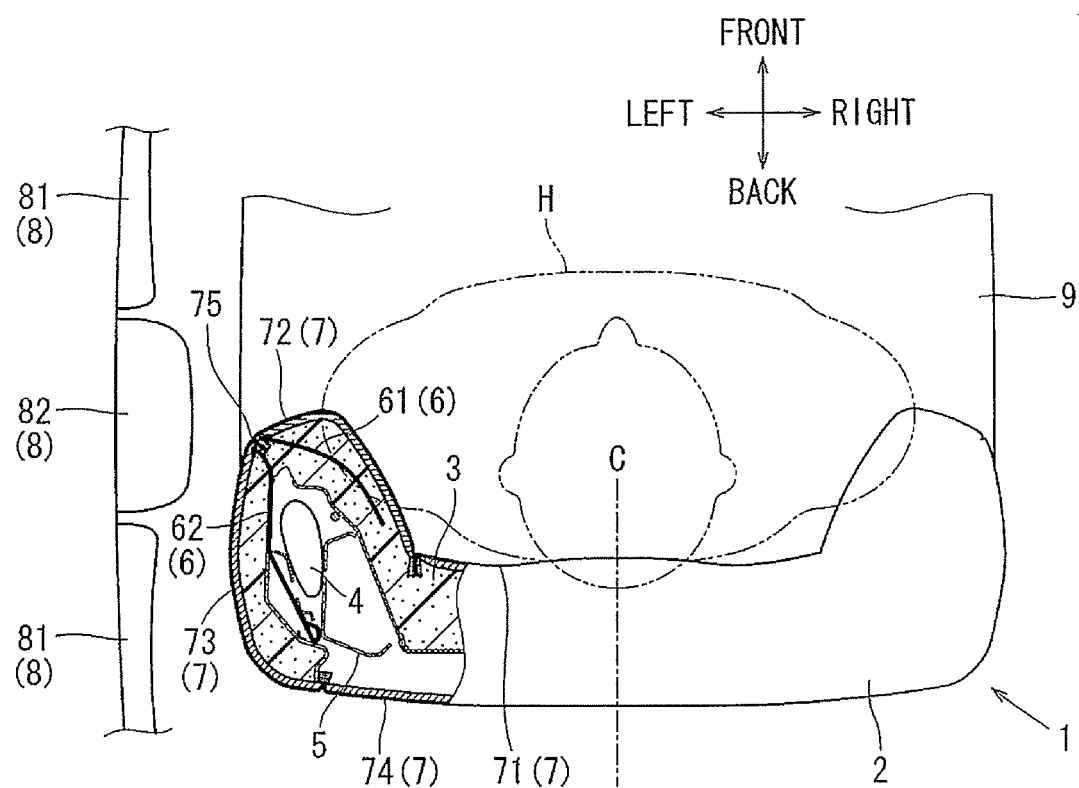
FIG. 1 is a schematic view for showing the relationships between locations of an occupant, webbing and an airbag module in a state where an occupant seats in a vehicular seat.
Figure 2:
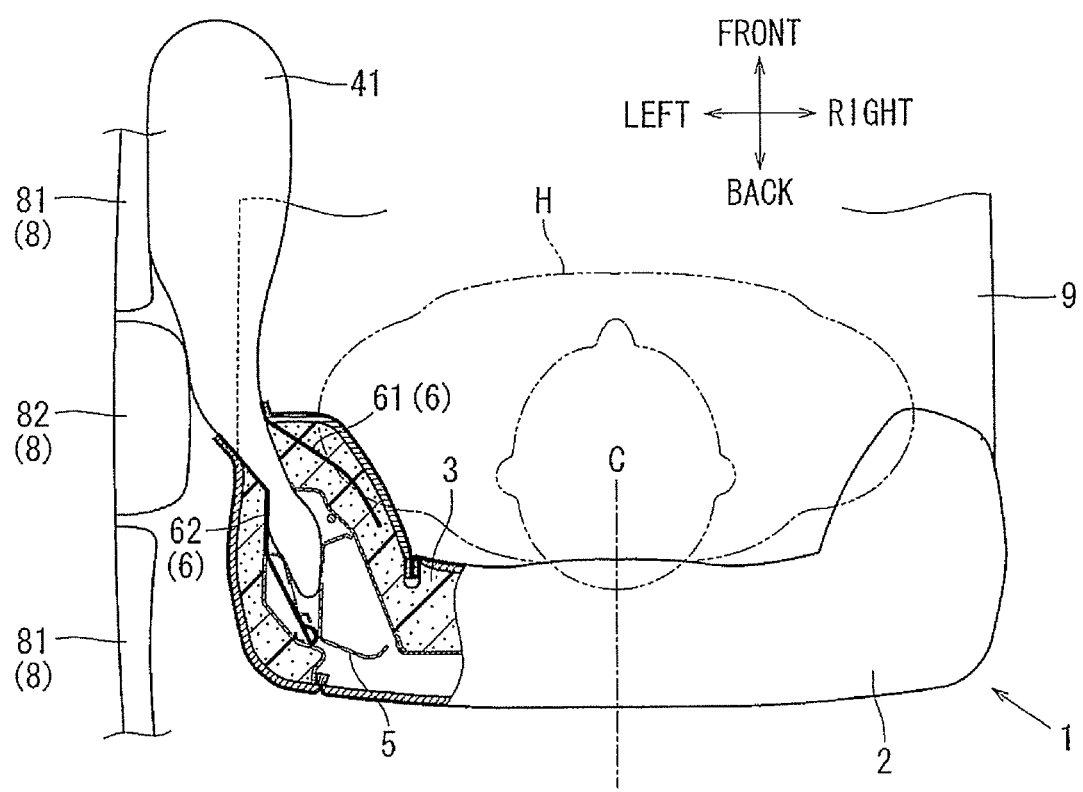
FIG. 2 is a schematic view for showing a situation where an airbag bursts out from a seat back.

In the following, an embodiment of the present invention will be described with reference to the drawings. Directions, such as front, back, left and right, are based on those as seen by an occupant H seated in a vehicular seat 1 as shown in FIG. 1. The vehicular seat 1 is equipped with a seat cushion 9, a seat back 2, and an airbag module 4. The airbag module 4 is equipped with a bag body 41 configured to burst out from the left side of the seat back 2.

Figure 3:
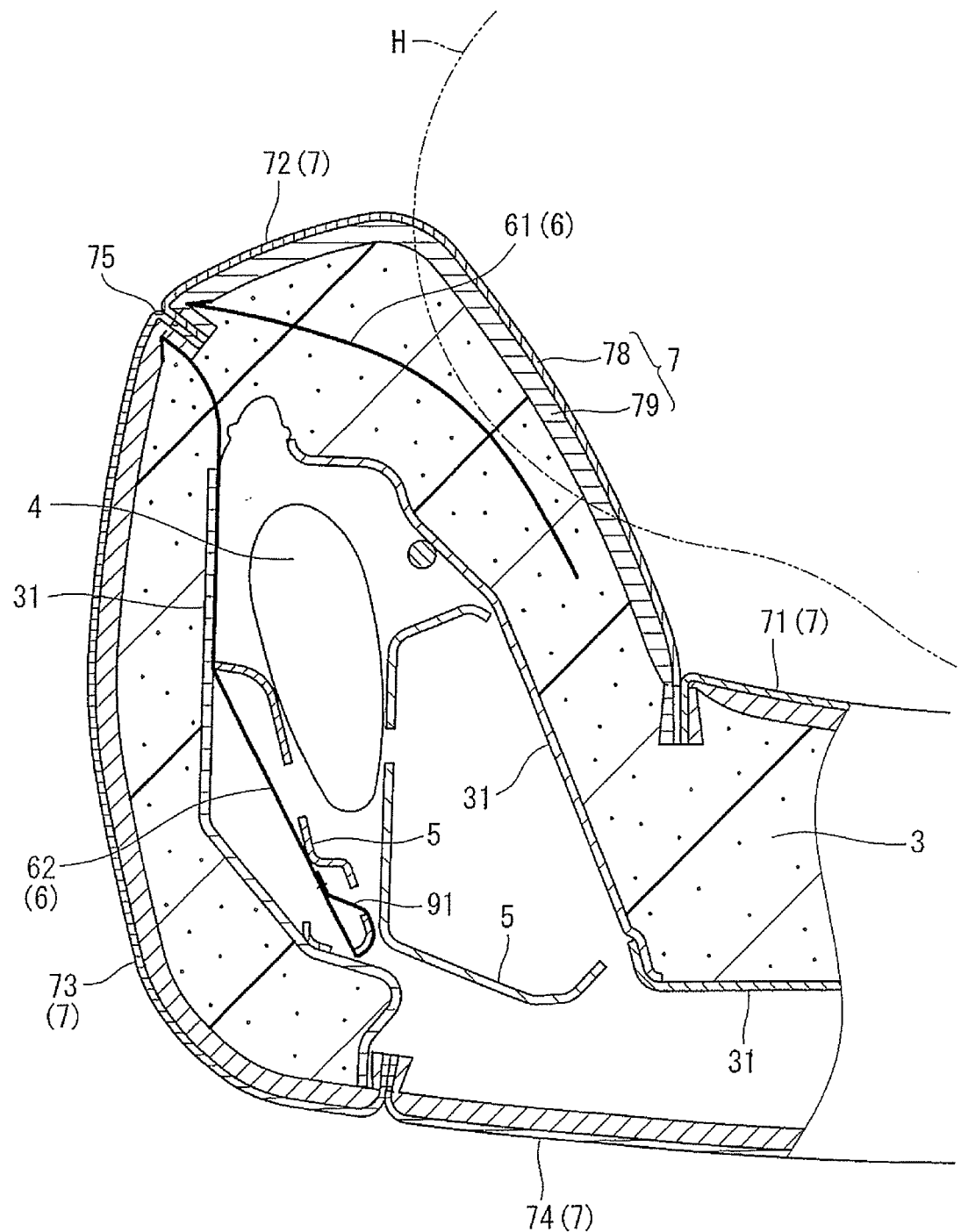
FIG. 3 is a cross-sectional view of the vehicular seat for showing an arrangement of webbing, the seat pad and the airbag module.
Figure 4:
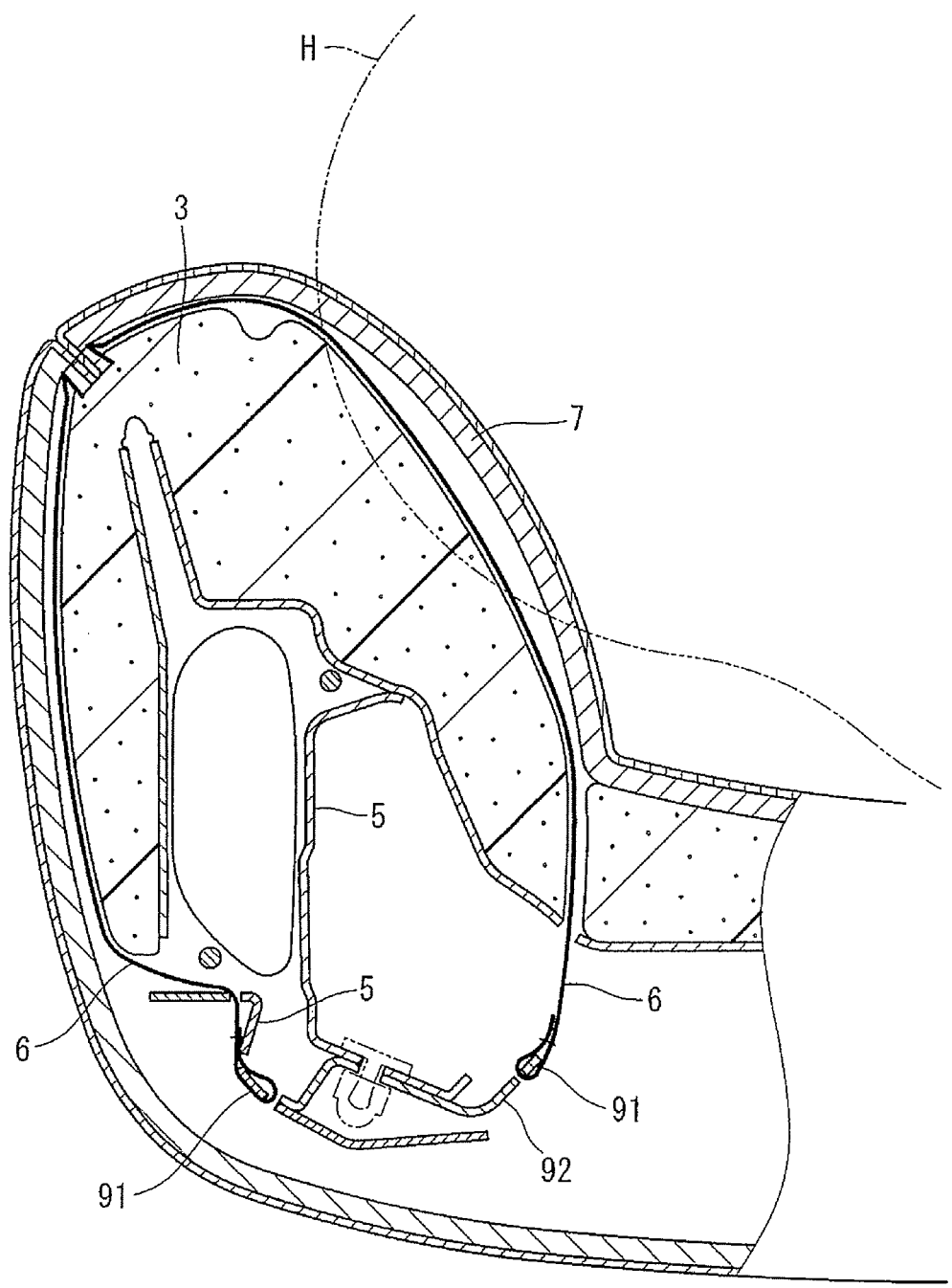
FIG. 4 is a cross-sectional view of a prior art vehicular seat showing an arrangement of webbing, a seat pad and an airbag module.

As shown in FIG. 3, the vehicular seat 1 has a seat cover 7 and a seat pad 3. The vehicle may be, for example, a car. The seat cover 7 is equipped with a skin 78 to contact the occupant and a back base cloth 79 on the opposite surface. The seat cover 7 can be formed integrally with the seat pad 3. The seat back 3 has a front surface facing the seat cover 7 and a back surface opposite to the front surface. A back surface member 31 is provided on the back surface of the seat pad 3. The seat pad 3 is situated between the seat cover 7 and the back surface member 31.

The seat cover 7 is equipped with a main surface portion 71, side front surface portions 72, side surface portions 73, and a back surface portion 74. The main surface portion 71 mainly constitutes a portion for contacting the occupant, and is astride a center axis C of the vehicular seat 1. The side front surface portion 72 extends obliquely forwards from the main surface portion 71. The side surface portion 73 is connected with the side front surface portion 72, and extends mainly along the side surface of the seat 1 to get around the back. The back surface portion 74 is connected with the side surface portion 73, and is arranged on the back of the seat 1.

The main surface portion 71, the side front surface portions 72, the side surface portions 73, and the back surface portion 74 are connected to each other by sewing. The sewn portion between the side front surface portion 72 and the side surface portion 73 forms a burst line 75. The burst line 75 is able to rupture when the bag body 41 of the airbag module 4 expands. The burst line 75 is provided on the side portion of the seat 1 close to a door 81 of a car body 8. The bag body 41 expands while developing forwards along a pillar 82 and the door 81. The seat pad 3 is provided with the back surface member 31. On the other hand, between the airbag module 4 and the burst line 75, there is provided an exposed portion not provided with the back surface member 31. When the bag body 41 expands, the exposed portion ruptures under the expanding pressure applied. As a result, the seat pad 75 ruptures.

The webbing 6 is substantially of a rectangular configuration. First webbing 61 and second webbing 62 are configured to regulate the direction in which the bag body 41 of the airbag module 41 develops. The first webbing 61 passes through the seat pad 3 along the side front surface portion 72 from the vicinity of the burst line 75. The second webbing 62 passes through the seat pad 3 along the side surface portion 73 from the vicinity of the burst line 75. The airbag module 4 is arranged between the first webbing 61 and the second webbing 62.

One longitudinal end of the first webbing 61 is held or fixed in position while integrated with the seat pad 3. The other longitudinal end thereof is connected to the side front surface portion 72 of the seat cover 7. One end of the first webbing 61 is integrated with the seat pad 3 at the time of forming of urethane resin, and is embedded in the seat pad 3. One end of the first webbing 61 is situated between the side front surface portion 72 of the seat cover 7 and the back surface member 31.

Even if the first webbing 61 is not connected to the seat frame 5, the first webbing 61 can sufficiently function. The first webbing 61 is arranged in a front region closer to the side front surface portion 72 than the seat airbag module 4. The front region is held by the airbag module 4 and the occupant H (See FIGS. 1 and 3). The load applied to the side front surface portion 72 by the occupant H acts against the force applied from the expanding bag body 41.

Thus, the bag body 41 develops laterally instead of being deformed forwardly so as to extend from the seat cover 7. The bag body 41 easily advances laterally rather than forwardly. Even when there is no first webbing 61, the side front surface portion 72 of the seat cover 7 receives the load from the occupant H. However, when there is no first webbing 61, the direction in which the bag body 41 advances is not sufficiently secured. Thus, the bag body 41 is likely to advance toward the seat cover 7, which is easy to deform. As a result, the possibility of the seat 1 not being ruptured at the burst line 75 is increased.

One longitudinal end of the second webbing 62 is fixed to the seat frame 5 via a fastening member 91. The other longitudinal end thereof is connected to the side surface portion 73 of the seat cover 7. One end of the second webbing 62 is fixed not to the seat pad 3 but to the seat frame 5. In this way, a part of the webbing 6 is fixed to the seat pad 3. Another part of the webbing 6 is not fixed to the seat pad 3. Even when only a part of the webbing 6 is fixed to the seat pad 3, it is possible to reduce the number of components of the seat 1. Also, it is possible to reduce the number of man-hours in manufacturing the seat 1.

The seat cover 7 and the webbing 6 are formed integrally with the seat pad 3. Before the formation of the seat pad 3, one end of the webbing 6 is bonded to the side front surface portion 72 of the seat cover 7. The other portion of the webbing 6 is in a free state. The seat cover 7 and the webbing 6 are connected together to form a connection body, which is set in a foaming mold. The foaming mold has an upper mold and a lower mold. The connection body is set in the foaming mold such that the seating surface of the seat cover 7 contacting the occupant faces an inner surface of the lower mold.

One end of the webbing 6 is supported so as to be situated in the hollow portion of the foaming mold. The support may be effected by any means. For example, a thread which is easy to cut may be connected to one end of the webbing 6. The tip end of the thread is fastened to a stationary portion provided on the inner surface of the foaming mold. This allows the entire webbing 6 to be situated in the hollow portion within the foaming mold.

The foaming mold is filled with urethane stock solution, and the lower mold is covered with the upper mold. The urethane stock solution undergoes chemical reaction through heating. Thereby, the urethane stock solution expands as a result of foaming. As a result, foam urethane fills the interior of the foaming mold to mold the seat pad 3. The foaming mold is cooled to cure the molding, and the molding is extracted. When extracting the molding from the foaming mold, the thread that has been supporting the webbing 6 is cut.

As a result, it is possible to embed the webbing 6 in the seat pad 3. The integral assembly, which has the seat cover 7, the seat pad 3, and the webbing 6, is mounted to the seat frame 5. The other components are attached to the seat frame 5 in the usual fashion. As a result, the vehicular seat 1 is completed.

One end portion (the right end in FIG. 3) or a first portion of the webbing 61 extending along the first surface side portion 72 is integrally fixed to the seat pad 3. Thus, there is no need to provide a component for mounting the end portion of the webbing 6 to the seat frame 5. There is no need to perform the operation of fixing the end portion of the webbing 6 to the seat frame 5.

The first end of the first webbing 61 is situated between the back surface member 31 and the seat cover 7. Thus, the webbing 61 can properly function. Further, it is possible to shorten the length of the webbing 61. The second end of the webbing 61 is bonded to the seat cover 7 in the vicinity of the burst line 75. Thus, at the time of its expansion, the bag body 41 is easily guided to the burst line 75. As a result, it is possible for the bag body 41 to burst out from the proper position on the seat 1.

The webbing 6 is embedded in the seat pad 3. Thus, the webbing 6 can be easily fixed to the seat pad 3 or mounted on the seat pad 3. Further, the webbing 6 is not easy to be found from the outside. Thus, it is possible to suppress the influence of the webbing 6 on a design property of the vehicular seat 1. The seat cover 7, the seat pad 3, and the webbing 6 are manufactured as an integrated mold. Thus, there is no need to cover the seat pad 3 with the seat cover 7 after the molding of the seat pad 3. The end portion of the first webbing 61 is situated while embedded in the seat pad 3. The end portion of the second webbing 62 is connected to the seat frame 5. Thus, both webbing 61 and 62 are not easily displaced, and the bag body 41 can properly develop from the burst line 75.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

As described above, the end portion of the webbing 6 may be connected to the seat cover 7. Alternatively, the end portion of the webbing 6 may not be connected to the seat cover 7. In this case, it is desirable for the end portion of the webbing 6 to be situated in the vicinity of the burst line 75. The end portion of the webbing 6 may be embedded in the seat pad 3. Also in this construction, the webbing 6 may regulate the developing direction of the bag body 41.

As described above, the seat pad 3 may be molded of urethane foam. Alternatively, the seat pad 3 may be molded or formed of some other resin.

As described above, the air bag module 4 may be attached to the side portion of the seat back 2 in the vicinity of the door 81. Alternatively, the air bag module 4 may be attached to some other portion of the seat 1. The webbing 6 can be set in conformity with the position of the airbag module 4. For example, the airbag module 4 can be arranged inside the seat cushion 9. At this time, the webbing 6 can be arranged such that the bag body 41 can properly expand to the exterior of the seat cushion 9.

As described above, the seat cover 7 may be molded integrally with the seat pad 3. Alternatively, the seat pad 3 may be covered with the seat cover 7 after the molding of the seat pad 3.

As described above, a first webbing 61 may be arranged so as to extend along the side front surface portion 72. A second webbing 62 may be arranged so as to extend along the side surface portion 73. Alternatively, a plurality of pieces of webbing may be arranged so as to extend along the side front surface portion 72 or/and the side surface portion 73. The number of pieces of webbing extending along the side front surface portion 72 and the number of pieces of webbing extending along the side surface portion 73 may be or may not be equal to each other.

As described above, one end of the webbing 62 extending along the side surface portion 73 may be mounted to the seat frame 5. Alternatively, if the rigidity of the side region including the seat pad 3 extending along the side surface portion 73 is high, one end of the webbing 62 may not be mounted to the seat frame 5 but may be supported by the side region.

As described above, the burst line 75 may be provided at the portion where the side front surface portion 72 and the side surface portion 73 are sewn together. Alternatively, the burst line may be provided where no sewing is performed. For example, the burst line may be a portion thinner than the other portions of the seat cover 7. In this case, the thin portion is more fragile than the other portions, thus making it possible to form the burst line.

As described above, it is possible to integrate separate pieces such as the main surface portion 71 and the side front surface portion 72 of the seat cover 7. Alternatively, the seat cover 7 may have a single sheet including pieces such as the main surface portion 71 and the side front surface portion 72. The occupant mainly contacts the main surface portion 71. The main surface portion 71 is astride the center axis of the vehicular seat 1. The side front surface portion 72 protrudes obliquely forwards mainly from the main surface portion 71.

As described above, webbing 62 extending along the side surface portion 73 may be provided. Instead of the webbing 62, a rigid plate member or the like may be provided. It is desirable for the plate member to be provided to extend along the side surface portion 73 so as to control the expanding direction of the bag body 41.

As described above, the bag body 41 may tear open the seat 1 to get out of the seat 1. Alternatively, the bag body may expand within the seat 1. In this case, it is desirable for the webbing to be arranged so that the bag body can expand from a desired position in the seat 1.

As described above, the vehicle may be a car, a vehicle flying through the air, or a vehicle moving on the sea surface or under the sea.

As described above, all of the first webbing 61 may be arranged inside of the seat pad 3. Alternatively, a portion of the first webbing 61 may be arranged inside of the seat pad 3. And the first webbing 61 may have an end extending from the seat pad 3.

As described above, the first webbing 61 may be arranged inside of the seat pad 3. Alternatively, the first webbing 61 may be arranged on the seat pad 3 and formed integrally with the seat pad 3. The first webbing 61 may extend on a surface of seat pad 3. The surface faces the seat cover 7 or the back surface member 31.

What is claimed is:

1. A vehicular seat comprising:
a seat pad;
a seat cover configured to cover the seat pad;
an airbag module provided inside the seat pad, the airbag module having a bag body; and
a first webbing arranged so as to regulate a direction in which the bag body expands, the first webbing having a first portion embedded in the seat pad in a free state such that the first portion is completely surrounded by the seat pad.

2. The vehicular seat of claim 1, wherein the first webbing has a second portion connected to the seat cover.

3. The vehicular seat of claim 2, wherein the second portion is connected to a burst line of the seat cover, the burst line being configured to be ruptured when the bag body expands.

4. The vehicular seat of claim 1, wherein the first webbing is completely embedded in the seat pad.

5. The vehicular seat of claim 1, wherein the seat cover is integrally provided with the seat pad.

6. The vehicular seat of claim 1, wherein the seat cover comprises:
- a main surface portion situated so as to contact a back of an occupant;
- a side front surface portion extending obliquely forwards from the main surface portion; and
- a side surface portion extending from the side front surface portion to form a side surface of the seat.

7. The vehicular seat of claim 6, further comprising:
the first webbing provided closer to the side front surface portion than the airbag module; and
a second webbing provided closer to the side surface portion than the airbag module.

8. The vehicular seat of claim 1, wherein the first portion is integrated with the seat pad.

9. The vehicular seat of claim 1, wherein the first portion is held by the seat pad so as to be fixed therein.

10. A vehicular seat comprising:
a seat pad;
a seat cover configured to cover the seat pad;
an airbag module provided inside the seat pad, the airbag module having a bag body; and
a first webbing arranged so as to regulate a direction in which the bag body expands, the first webbing having a first end portion and a second end portion, the first end portion being embedded in the seat pad such that the first end portion is completely surrounded by the seat pad, the second end portion being connected to a burst line of the seat cover, and the burst line being configured to be ruptured when the bag body expands.

11. The vehicular seat of claim 10, wherein the first end portion is integrated with the seat pad.

12. The vehicular seat of claim 10, wherein the first end portion is held by the seat pad so as to be fixed therein.

* * * * *